(12) United States Patent
Sadaki et al.

(10) Patent No.: US 11,699,824 B2
(45) Date of Patent: *Jul. 11, 2023

(54) NICKEL-PLATED, HEAT-TREATED STEEL SHEET FOR BATTERY CANS

(71) Applicant: TOYO KOHAN CO., LTD., Tokyo (JP)

(72) Inventors: Kota Sadaki, Yamaguchi (JP); Koh Yoshioka, Yamaguchi (JP)

(73) Assignee: TOYO KOHAN CO., LTD., Tokyo (JP)

( * ) Notice: Subject to any disclaimer, the term of this patent is extended or adjusted under 35 U.S.C. 154(b) by 63 days.

This patent is subject to a terminal disclaimer.

(21) Appl. No.: 17/018,675

(22) Filed: Sep. 11, 2020

(65) Prior Publication Data

US 2021/0028415 A1 Jan. 28, 2021

Related U.S. Application Data

(62) Division of application No. 15/780,862, filed as application No. PCT/JP2016/086121 on Dec. 5, 2016, now Pat. No. 10,873,061.

(30) Foreign Application Priority Data

Dec. 3, 2015 (JP) .............................. JP2015-236710

(51) Int. Cl.
*H01M 50/124* (2021.01)
*C25D 7/00* (2006.01)
(Continued)

(52) U.S. Cl.
CPC ......... *H01M 50/124* (2021.01); *B32B 15/013* (2013.01); *B32B 15/015* (2013.01);
(Continued)

(58) Field of Classification Search
None
See application file for complete search history.

(56) References Cited

U.S. PATENT DOCUMENTS 11,196,114 B2 12/2021 Asada et al.
2005/0089752 A1 4/2005 Ohmura et al.
(Continued)

FOREIGN PATENT DOCUMENTS

CN 1314009 A 9/2001
CN 1647293 A 7/2005
(Continued)

OTHER PUBLICATIONS https://www.merriam-webster.com/thesaurus/constituting (Year: unknown).*

(Continued)

*Primary Examiner* — Gregg Cantelmo
(74) *Attorney, Agent, or Firm* — Muncy, Geissler, Olds & Lowe, P.C.

(57) ABSTRACT

The present invention provides a nickel-plated heat-treated steel sheet for a battery can (1), having a nickel layer with a nickel amount of 4.4 to 26.7 g/m² on a steel sheet (11), wherein when the Fe intensity and the Ni intensity are continuously measured along the depth direction from the surface of the nickel-plated heat-treated steel sheet for a battery can, by using a high frequency glow discharge optical emission spectrometric analyzer, the difference (D2-D1) between the depth (D1) at which the Fe intensity exhibits a first predetermined value and the depth (D2) at which the Ni intensity exhibits a second predetermined value is less than 0.04 μm.

7 Claims, 6 Drawing Sheets

(A)

(B)

(51) Int. Cl.

| | | |
|---|---|---|
| *C23C 28/02* | (2006.01) | |
| *C23C 10/20* | (2006.01) | |
| *C23C 10/30* | (2006.01) | |
| *C23C 10/02* | (2006.01) | |
| *C23C 10/18* | (2006.01) | |
| *C23C 10/28* | (2006.01) | |
| *C25D 5/48* | (2006.01) | |
| *B32B 15/04* | (2006.01) | |
| *C23C 10/08* | (2006.01) | |
| *C23C 30/00* | (2006.01) | |
| *B32B 15/18* | (2006.01) | |
| *B32B 15/01* | (2006.01) | |
| *C23C 10/60* | (2006.01) | |
| *H01M 50/107* | (2021.01) | |
| *H01M 50/213* | (2021.01) | |
| *C25D 7/06* | (2006.01) | |
| *H01M 50/119* | (2021.01) | |
| *H01M 50/133* | (2021.01) | |
| *H01M 50/134* | (2021.01) | |
| *H01M 50/145* | (2021.01) | |
| *C25D 5/50* | (2006.01) | |
| *C25D 3/12* | (2006.01) | |
| *H01M 50/131* | (2021.01) | |

(52) U.S. Cl.
CPC ............ *B32B 15/04* (2013.01); *B32B 15/043* (2013.01); *B32B 15/18* (2013.01); *C23C 10/02* (2013.01); *C23C 10/08* (2013.01); *C23C 10/18* (2013.01); *C23C 10/20* (2013.01); *C23C 10/28* (2013.01); *C23C 10/30* (2013.01); *C23C 10/60* (2013.01); *C23C 28/02* (2013.01); *C23C 28/021* (2013.01); *C23C 28/023* (2013.01); *C23C 30/00* (2013.01); *C23C 30/005* (2013.01); *C25D 3/12* (2013.01); *C25D 5/48* (2013.01); *C25D 5/50* (2013.01); *C25D 7/00* (2013.01); *C25D 7/0614* (2013.01); *H01M 50/107* (2021.01); *H01M 50/119* (2021.01); *H01M 50/1245* (2021.01); *H01M 50/133* (2021.01); *H01M 50/134* (2021.01); *H01M 50/145* (2021.01); *H01M 50/213* (2021.01); *B32B 2250/03* (2013.01); *B32B 2311/22* (2013.01); *B32B 2311/30* (2013.01); *B32B 2439/00* (2013.01); *H01M 50/1243* (2021.01); *H01M 50/131* (2021.01); *Y02E 60/10* (2013.01); *Y10T 428/12937* (2015.01); *Y10T 428/12944* (2015.01); *Y10T 428/12951* (2015.01); *Y10T 428/12958* (2015.01); *Y10T 428/12965* (2015.01); *Y10T 428/12972* (2015.01); *Y10T 428/12979* (2015.01); *Y10T 428/12993* (2015.01); *Y10T 428/2495* (2015.01); *Y10T 428/24942* (2015.01); *Y10T 428/24967* (2015.01); *Y10T 428/24975* (2015.01); *Y10T 428/263* (2015.01); *Y10T 428/264* (2015.01); *Y10T 428/265* (2015.01); *Y10T 428/27* (2015.01)

(56) References Cited

U.S. PATENT DOCUMENTS

| | | | |
|---|---|---|---|
| 2006/0083981 A1 | 4/2006 | Mori | |
| 2008/0026287 A1* | 1/2008 | Adachi | H01M 6/08 429/163 |
| 2008/0305392 A1 | 12/2008 | Ohmura et al. | |
| 2009/0311595 A1* | 12/2009 | Mori | H01M 50/128 429/174 |
| 2011/0159355 A1 | 6/2011 | Ohmura et al. | |
| 2012/0219825 A1* | 8/2012 | Minagi | C25D 5/36 428/679 |
| 2012/0231329 A1 | 9/2012 | Ohmura et al. | |
| 2014/0147735 A1 | 5/2014 | Ohmura et al. | |
| 2015/0162576 A1 | 6/2015 | Horie et al. | |
| 2016/0168657 A1* | 6/2016 | Horie | C23C 10/28 148/518 |
| 2018/0347061 A1 | 12/2018 | Sadaki et al. | |
| 2018/0351138 A1 | 12/2018 | Asada et al. | |
| 2018/0366691 A1 | 12/2018 | Sadaki et al. | |
| 2021/0028415 A1 | 1/2021 | Sadaki et al. | |
| 2021/0151824 A1 | 5/2021 | Sadaki et al. | |

FOREIGN PATENT DOCUMENTS

| | | |
|---|---|---|
| CN | 103597626 A | 2/2014 |
| CN | 108291323 A | 7/2018 |
| CN | 108368628 A | 8/2018 |
| CN | 108368629 A | 8/2018 |
| EP | 1498963 A1 | 1/2005 |
| EP | 2441532 A1 | 4/2012 |
| EP | 2472631 A1 | 7/2012 |
| JP | H06-002104 A | 1/1994 |
| JP | 2006-093095 A | 4/2006 |
| JP | 4817724 B2 | 11/2011 |
| JP | 2013-170308 | 9/2013 |
| JP | 2014-009401 A | 1/2014 |
| KR | 10-0696929 B1 | 3/2007 |
| WO | WO03/098718 A1 | 11/2003 |
| WO | WO-2014/007025 A1 | 1/2014 |

OTHER PUBLICATIONS

Chinese Office Action with English translation issued in counterpart application No. CN201680070718.5, dated Sep. 24, 2020, 13 pages.
Office Action dated Jun. 15, 2021 in related U.S. Appl. No. 15/780,935, 12 pages.
Office Action dated Dec. 7, 2021 in U.S. Appl. No. 17/162,667, 23 pages.
Office Action dated Aug. 10, 2020 in CN Application No. 201680070719.X, with English translation (14 pages).
Chinese Office Action with English translation cited in counterpart application No. 201680070718.5 dated Sep. 24, 2020, with English translation (13 pages).
Official Action issued in corresponding CN patent application No. 201680070779.1 dated May 12, 2020, with English translation (13 pages).
Official Action issued in corresponding JP patent application No. 2017-554215 dated Jun. 30, 2020, with English translation (6 pages).
Official Action issued in corresponding JP patent application No. 2017-554216 dated Jun. 30, 2020, with English translation (6 pages).
Official Action issued in corresponding JP patent application No. 2017-554217 dated Jun. 30, 2020, with English translation (6 pages).
Official Action issued in corresponding U.S. Appl. No. 15/780,929 dated Jun. 19, 2020 (12 pages).
Panasonic Industrial AA (LR6XWA) Data Sheet downloaded from https://b2b-api.panasonic.eu/file_stream/pids/fileversion/3678; Jun. 19, 2009; 2 pages.
Final Office Action issued in corresponding U.S. Appl. No. 15/780,935 dated Dec. 14, 2020 (12 pages).
Chinese Office Action dated Jul. 3, 2019 in CN Application No. 201680070779.1.
Chinese Office Action (7 pp.) with an English Language Translation (6 pp.) based on corresponding Chinese Application No. 201680070719. X, dated Jul. 16, 2019.
European Search Report dated Mar. 14, 2019 in EP App. No. 16870853.5.
European Search Report dated Mar. 14, 2019 in EP App. No. 16870854.3.
European Search Report dated Apr. 4, 2019 in EP App. No. 16870855.0.

(56) References Cited

OTHER PUBLICATIONS

Office Action of U.S. Appl. No. 15/780,929, dated Oct. 3, 2019, 13 pages.
Second Office Action issued in corresponding CN application No. 201680070719.X dated Aug. 10, 2020.
Official Action issued in corresponding CN patent application No. 201680070779.1 dated May 12, 2020 (with English Translation).
Official Action issued in corresponding JP patent application No. 2017-554215 dated Jun. 30, 2020 (with English Translation).
Official Action issued in corresponding JP patent application No. 2017-554216 dated Jun. 30, 2020 (with English Translation).
Official Action issued in corresponding JP patent application No. 2017-554217 dated Jun. 30, 2020 (with English Translation).
Official Action issued in corresponding U.S. Appl. No. 15/780,929 dated Jun. 19, 2020 (with English Translation).
Official Action issued in corresponding U.S. Appl. No. 15/780,935 dated Jun. 19, 2020 (with English Translation).
Office Action dated Mar. 17, 2020 in corresponding CN Application No. 201680070718.5.
Final Office Action dated Mar. 25, 2022 in U.S. Appl. No. 17/162,667, 13 pages.
Advisory Action issued in related U.S. Appl. No. 15/780,935, dated Apr. 7, 2021 (4 pages).
Advisory Action in corresponding U.S. Appl. No. 17/162,667, dated Jun. 10, 2022, 4 pages.
Office Action dated Aug. 2, 2022 in U.S. Appl. No. 17/162,667, 11 pages.
Office Action dated Sep. 7, 2022 in U.S. Appl. No. 17/512,022, 29 pages.
Office Action of KR Application No. 10-2018-7018438 and English translation, dated Nov. 8, 2022, 6 pages.
Office Action of KR Application No. 10-2018-7018439 and English translation, dated Nov. 8, 2022, 6 pages.
Office Action of KR Application No. 10-2018-7018440 and English translation, dated Nov. 8, 2022, 6 pages.
Office Action of U.S. Appl. No. 17/512,022, dated Dec. 22, 2022, 15 pages.
Office Action of U.S. Appl. No. 17/162,667, dated Jan. 5, 2023, 16 pages.

* cited by examiner (A)

(B)

NICKEL-PLATED, HEAT-TREATED STEEL SHEET FOR BATTERY CANS

CROSS REFERENCE TO RELATED APPLICATIONS

This application is a divisional application of U.S. patent application Ser. No. 15/780,862, filed on Jul. 6, 2018, which has been issued to U.S. Pat. No. 10,873,061 B2 and claims priority of Japan Patent Application No. 2015-236710 filed on Dec. 3, 2015, the entirety of which is incorporated by reference herein.

TECHNICAL FIELD

The present invention relates to a nickel-plated heat-treated steel sheet for a battery can.

BACKGROUND ART

Recently, portable devices such as audio instruments and cellular phones have been used in various fields, and there have been used as the operating power sources thereof many primary batteries such as alkaline batteries and many secondary batteries such as nickel-hydrogen batteries and lithium-ion batteries. Such batteries are demanded to achieve long operating lives, high performances and the like by the achievement of high performances of the devices being mounted with such batteries, and the battery containers and the battery cans packed with power generation elements composed of positive electrode active materials, negative electrode active materials and the like are also demanded to be improved in the performances as the important constituent elements of the batteries.

As the surface-treated steel sheets to form such battery can, for example, Patent Documents 1 and 2 disclose surface-treated steel sheets each prepared by forming a nickel plating layer on a steel sheet, and then forming an iron-nickel diffusion layer by applying a heat treatment to the nickel plated steel sheet.

RELATED ART

Patent Documents

Patent Document 1: Japanese Patent Laid-Open No. 2014-009401

Patent Document 2: Japanese Patent Laid-Open No. 6-2104

SUMMARY OF THE INVENTION

Problem to be Solved by the Invention

However, in Patent Documents 1 and 2, as described above, the heat treatment condition in the formation of the iron-nickel diffusion layer is a high temperature or a long time, the inter-diffusion between the iron in the steel sheet serving as a substrate and the nickel in the nickel plating layer tends to proceed; thus, on the obtained surface-treated steel sheet, there is famed an iron-nickel diffusion layer, and there is also formed, in the upper layer of the iron-nickel diffusion layer, a nickel layer remaining as a nickel layer but being softened due to the progress of recrystallization, or a softer iron-nickel diffusion layer.

When such a surface-treated steel sheet is processed into a battery can, because the outermost layer is soft, the sticking of the nickel layer to the mold (punch) tends to occur as compared with the case where a surface-treated steel sheet free from the application of a heat treatment after plating is processed.

However, when a nickel-plated steel sheet free from the application of a heat treatment after plating is processed to form a battery can, the base iron tends to be dissolved from the steel sheet serving as a substrate and thus the battery can is poor in corrosion resistance.

An object of the present invention is to provide a nickel-plated heat-treated steel sheet for a battery can, excellent in corrosion resistance due to the suppression of the dissolution of iron, and having a hard coating.

Means for Solving the Problem

According to the present invention, there is provided a nickel-plated heat-treated steel sheet for a battery can, having a nickel layer with a nickel amount of 4.4 to 26.7 $g/m^2$ on a steel sheet, wherein when the Fe intensity and the Ni intensity are continuously measured along the depth direction from the surface of the nickel-plated heat-treated steel sheet for a battery can, by using a high frequency glow discharge optical emission spectrometric analyzer, the difference (D2-D1) between the depth (D1) at which the Fe intensity exhibits a first predetermined value and the depth (D2) at which the Ni intensity exhibits a second predetermined value is less than 0.04 μm.

It is to be noted that the depth (D1) exhibiting the first predetermined value is the depth exhibiting an intensity of 10% of the saturated value of the Fe intensity measured by the above-described measurement, and the depth (D2) exhibiting the second predetermined value is the depth exhibiting an intensity of 10% of the maximum value when the measurement is further performed along the depth direction after the Ni intensity shows the maximum value by the above-described measurement.

In the nickel-plated heat-treated steel sheet for a battery can of the present invention, the ratio of the thickness of the iron-nickel diffusion layer to the thickness of the nickel layer (thickness of iron-nickel diffusion layer/thickness of nickel layer) is preferably more than 0 and 0.08 or less, and more preferably 0.0001 to 0.05.

In the nickel-plated heat-treated steel sheet for a battery can of the present invention, the thickness of the nickel layer is preferably more than 0.5 μm.

In the nickel-plated heat-treated steel sheet for a battery can of the present invention, the Vickers hardness (HV) of the nickel layer measured with a load of 10 gf is preferably more than 220.

According to the present invention, there is provided a battery container made of the above-described nickel-plated heat-treated steel sheet for a battery can.

According to the present invention, there is also provided a battery provided with the above-described battery container.

Moreover, according to the present invention, there is provided a method for producing a nickel-plated heat-treated steel sheet for a battery can including: a nickel plating step of forming a nickel plating layer with a nickel amount of 4.4 to 26.7 $g/m^2$; and a heat treatment step of applying a heat treatment to the steel sheet having the nickel plating layer formed thereon by maintaining the steel sheet at a temperature of 350° C. or higher and lower than 450° C. for 30 minutes to 2 minutes.

Effects of Invention

According to the present invention, it is possible to provide a nickel-plated heat-treated steel sheet for a battery can suppressing sticking on the basis of hardening of coating, being excellent in continuous pressability, and also being excellent in corrosion resistance. In addition, according to the present invention, it is possible to provide a battery container and a battery obtained by using such a nickel-plated heat-treated steel sheet for a battery can.

DESCRIPTION OF EMBODIMENTS

Hereinafter, one Embodiment of the present invention is described by way of the accompanying drawings. The nickel-plated heat-treated steel sheet for a battery can according to the present invention is processed into an external shape corresponding to the desired shape of a battery. Examples of a battery may include, without being particularly limited to: primary batteries such as an alkaline battery, and secondary batteries such as a nickel-hydrogen battery and a lithium-ion battery; as the members of the battery containers of these batteries, the nickel-plated heat-treated steel sheet for a battery can according to the present invention can be used. Hereinafter, the present invention is described on the basis of an embodiment using the nickel-plated heat-treated steel sheet for a battery can according to the present invention for a positive electrode can constituting the battery container of an alkaline battery.

Figure 1:
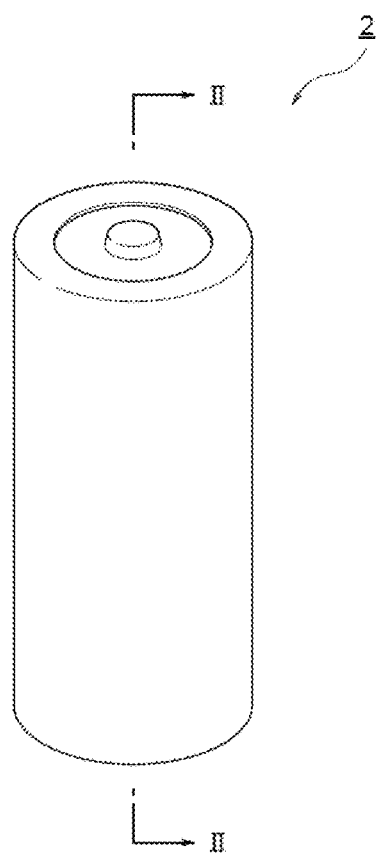
FIG. 1 is an oblique perspective view showing one embodiment of a battery undergoing an application of the nickel-plated heat-treated steel sheet for a battery can according to the present invention.
Figure 2:
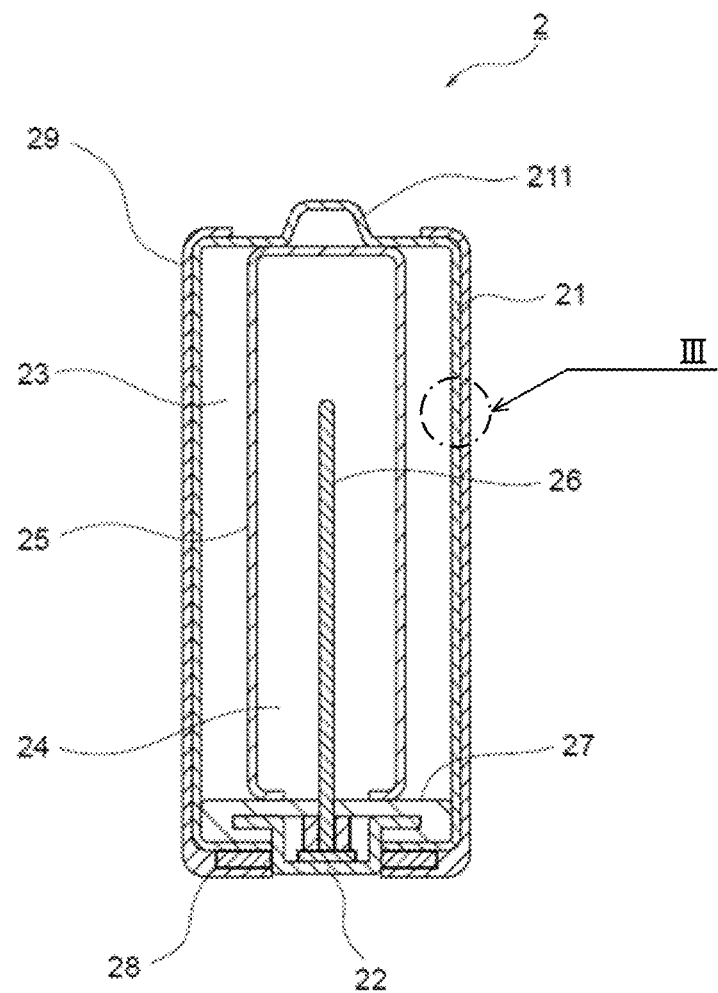
FIG. 2 is a cross-sectional view along the line II-II in FIG. 1.

FIG. 1 is an oblique perspective view showing one embodiment of an alkaline battery 2 undergoing an application of the nickel-plated heat-treated steel sheet for a battery can according to the present invention, and FIG. 2 is a cross-sectional view along the line II-II in FIG. 1. The alkaline battery 2 of the present example includes a positive electrode mixture 23 and a negative electrode mixture 24 filled inside the positive electrode can 21 having a bottomed cylindrical shape through the intermediary of a separator 25; and a sealing body constituted with a negative electrode terminal 22, a current collector 26 and a gasket 27 caulked on the inner surface side of the opening section of the positive electrode can 21. A convex positive electrode terminal 211 is foiled in the bottom center of the positive electrode can 21. In addition, an exterior case 29 is mounted on the positive electrode can 21 through the intermediary of an insulating ring 28, for the purpose of imparting insulation properties, improving the design, and the like.

The positive electrode can 21 of the alkaline battery 2 shown in FIG. 1 is obtained by mold-processing the nickel-plated heat-treated steel sheet for a battery can according to the present invention, by applying, for example, a deep drawing processing method, a drawing and ironing processing method (DI processing method), a drawing thin and redrawing processing method (DTR processing method), or a processing method using a stretch processing and an ironing processing after a drawing processing. Hereinafter, with reference to FIG. 3, the constitution of the nickel-plated heat-treated steel sheet for a battery can (nickel-plated heat-treated steel sheet 1) according to the present invention is described.

Figure 3:
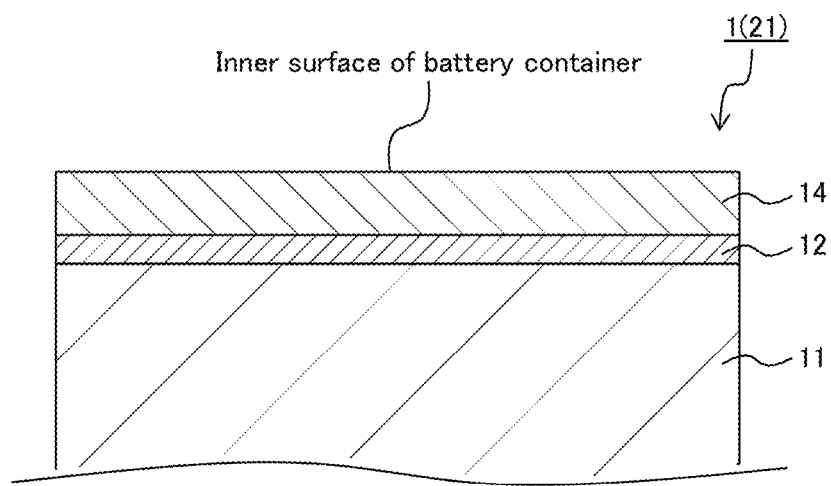
FIG. 3 is an enlarged cross-sectional view of the portion III in FIG. 2, in one embodiment of the nickel-plated heat-treated steel sheet for a battery can of the present invention.

FIG. 3 is an enlarged cross-sectional view of the portion III of the positive electrode can 21 shown in FIG. 2, and the upper side in FIG. 3 corresponds to the inner surface (the surface in contact with the positive electrode mixture 23 of the alkaline battery 2) of the alkaline battery 2 of FIG. 1. The nickel-plated heat-treated steel sheet 1 of the present embodiment includes, as shown in FIG. 3, an iron-nickel diffusion layer 12 and a nickel layer 14 formed on a steel sheet 11 constituting the substrate of the nickel-plated heat-treated steel sheet 1.

The nickel-plated heat-treated steel sheet 1 of the present embodiment has a nickel layer with a nickel amount of 4.4 to 26.7 g/m$^2$ on a steel sheet, and the difference of D2-D1 as measured by a high frequency glow discharge optical emission spectrometric analyzer is less than 0.04 μm. Herewith, the nickel-plated heat-treated steel sheet 1 of the present embodiment is capable of suppressing the sticking to the mold when processed into a battery can, on the basis of hardening of coating, and accordingly excellent in continuous pressability and also excellent in the corrosion resistance after being processed into a battery can.

<Steel Sheet 11>

The steel sheet 11 of the present embodiment is not particularly limited as long as the steel sheet 11 is excellent in molding processability; for example, a low carbon aluminum-killed steel (carbon content: 0.01 to 0.15% by weight), a low carbon steel having a carbon content of 0.003% by weight or less, or a non-aging low carbon steel prepared by adding Ti, Nb or the like to a low carbon steel can be used. The thickness of the steel sheet is not particularly limited, but is preferably 0.2 to 0.5 mm. When the steel sheet is too thick, the heat quantity necessary for diffusion is deficient, and the diffusion layer is liable to be formed insufficiently. When the steel sheet is too thin, the thickness necessary as the subsequent battery sometimes cannot be secured, or the heat conduction is fast and the control of the thickness of the diffusion layer is liable to be difficult.

In the present embodiment, the hot rolled sheets of these steels are washed with an acid to remove the scales (oxide film), then cold rolled, then electrolytically washed, then annealed and subjected to temper rolling, and are used as the steel sheets 11; or alternatively, the hot rolled sheets of these steels washed with an acid to remove the scales (oxide film), then cold rolled, then electrolytically washed, then subjected to temper rolling without being subjected to annealing, and are used as the steel sheets 11.

<Iron-Nickel Diffusion Layer 12, and Nickel Layer 14>

In the nickel-plated heat-treated steel sheet 1 of the present embodiment, the nickel plating layer 13 is formed on the steel sheet 11, and then a heat treatment is performed. In this case, the iron-nickel diffusion layer 12 is a layer foamed as a result of the thermal diffusion of the iron constituting the steel sheet 11 and the nickel constituting the nickel plating layer 13 and allowing iron and nickel mutually diffuse therein. The nickel layer 14 is a layer derived from the portion free from the diffusion of iron in the vicinity of the surface layer of the nickel plating layer 13, the portion being thermally recrystallized and softened when the heat treatment is performed.

It is to be noted that in the present embodiment, by performing nickel plating and heat treatment as described below, the iron-nickel diffusion layer 12 is formed as extremely thin as less than 0.04 μm.

The nickel plating layer 13 can be formed on the steel sheet 11 by using, for example, a nickel plating bath. As the nickel plating bath, there can be used a plating bath usually used in nickel plating, namely, a Watts bath, a sulfamate bath, a boron fluoride bath, a chloride bath and the like. For example, the nickel plating layer 13 can be formed by using, as a watts bath, a bath having a bath composition containing nickel sulfate in a concentration of 200 to 350 g/L, nickel chloride in a concentration of 20 to 60 g/L, and boric acid in a concentration of 10 to 50 g/L, under the conditions that the pH is 3.0 to 4.8 (preferably pH is 3.6 to 4.6), the bath temperature is 50 to 70° C., the current density is 10 to 40 $A/dm^2$ (preferably 20 to 30 $A/dm^2$).

It is to be noted that as the nickel plating layer 13, a sulfur-containing bright plating is not preferable because the battery properties are liable to be degraded; however, it is possible in the present invention to apply a matte plating not containing sulfur in an amount equal to or more than the amount of an inevitable impurity as well as a semi-gloss plating. This is because the hardness of the layer obtained by plating is as follows: the semi-gloss plating is harder than the matte plating, but the heat treatment for forming the diffusion layer in the present invention allows the hardness of the semi-gloss plating to be comparable with or slightly higher than the hardness of the matte plating. When a semi-gloss plating is foiled as a nickel plating layer, a semi-gloss agent may be added to the above-described plating baths. The semi-gloss agent is not particularly limited as long as the semi-gloss agent allows the nickel plating layer after plating to be free from sulfur (for example, 0.05% or less in an fluorescent X-ray measurement); as the semi-glass agent, it is possible to use, for example, an aliphatic unsaturated alcohol such as a polyoxyethylene adduct of an unsaturated alcohol, an unsaturated carboxylic acid, formaldehyde, and coumarin.

Figure 4:
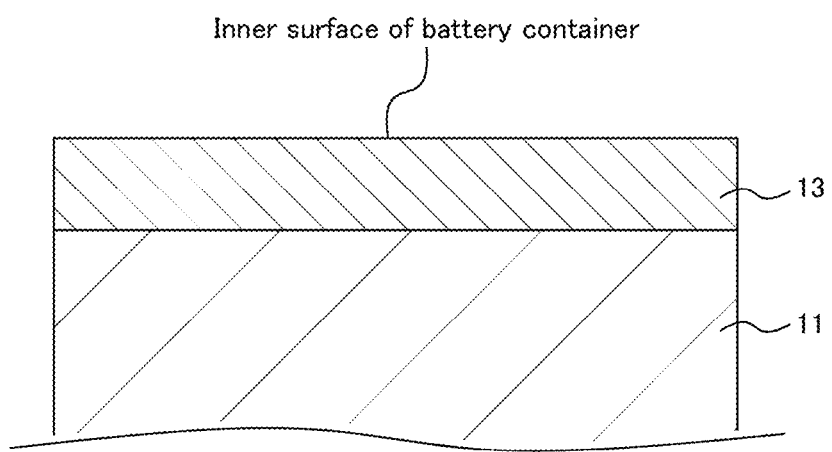
FIG. 4 is a diagram for illustrating the method for producing the nickel-plated heat-treated steel sheet for a battery can shown in FIG. 3.

In the present embodiment, as shown in FIG. 4, the above-described nickel plating layer 13 is formed on the steel sheet 11, and subsequently a heat treatment is pertained; thus, the iron-nickel diffusion layer 12 and the nickel layer 14 are foamed, and the nickel-plated heat-treated steel sheet 1 as shown in FIG. 3 can be obtained.

In the present embodiment, the nickel amount in the nickel plating layer 13 before perfoming the heat treatment corresponds to the total amount of the nickel contained in the iron-nickel diffusion layer 12 and the nickel contained in the nickel layer 14 obtained by the heat treatment.

The total amount (the nickel amount in the nickel plating layer 13 before performing the heat treatment) of the nickel contained in the iron-nickel diffusion layer 12 and the nickel contained in the nickel layer 14 obtained by the heat treatment may be 4.4 to 26.7 $g/m^2$, is preferably 8.9 to 26.0 $g/m^2$, and is more preferably 10.0 to 25.0 $g/m^2$. When the total amount of the nickel contained in the iron-nickel diffusion layer 12 and the nickel contained in the nickel layer 14 is too small, the improvement effect of the corrosion resistance due to nickel is insufficient, and the corrosion resistance of the obtained nickel-plated heat-treated steel sheet 1 used as a battery container is liable to decrease, and the continuous pressability is liable to be degraded when the obtained nickel-plated heat-treated steel sheet 1 is processed into a battery container because the hardness is decreased. On the other hand, when the total amount of the nickel contained in the iron-nickel diffusion layer 12 and the nickel contained in the nickel layer 14 is too large, there is an adverse possibility that the delamination occurs in the nickel-plated heat-treated steel sheet 1 due to the insufficient adhesiveness with the steel sheet 11 serving as the substrate. In addition, when the obtained nickel-plated heat-treated steel sheet 1 is processed into a battery container, the thickness of the can wall comes to be thick, and the volume of the interior of the battery container comes to be small (the volume percentage comes to be decreased). The total amount of the nickel contained in the iron-nickel diffusion layer 12 and the nickel contained in the nickel layer 14 can be determined by a method calculating on the basis of the total amount (total weight) of the nickel contained in the iron-nickel diffusion layer 12 and the nickel contained in the nickel layer 14 measurable with an ICP analysis method. Alternatively, the total amount of the nickel contained in the iron-nickel diffusion layer 12 and the nickel contained in the nickel layer 14, can also be determined by a method calculating on the basis of the measured deposition amount obtained by measuring the deposition amount of the nickel atoms constituting the nickel plating layer 13 by performing a fluorescent X-ray measurement after the formation of the nickel plating layer 13 and before performing the heat treatment.

The conditions of the heat treatment may be appropriately selected according to the thickness of the nickel plating layer 13; the heat treatment temperature is preferably 350° C. or higher and 450° C. or lower, more preferably 400 to 450° C., and further preferably 420 to 450° C.; the soaking time in the heat treatment is preferably 30 seconds to 2 minutes, more preferably 30 to 100 seconds, and further preferably 45 to 90 seconds. In addition, in the heat treatment, the time including the heating up time and the cooling time in addition to the soaking time is preferably 2 to 7 minutes and more preferably 3 to 5 minutes. The heat treatment method is preferably a continuous annealing method from the viewpoint of easy regulation of the heat treatment temperature and the heat treatment time within the above-described ranges.

In the present invention, by performing the heat treatment as described above, the iron-nickel diffusion layer 12 is formed between the steel sheet 11 and the nickel layer 14, and the nickel-plated heat-treated steel sheet 1 has a constitution (Ni/Fe—Fe) in which the iron-nickel diffusion layer 12 and the nickel layer 14 are arranged in this order on the steel sheet 11.

In this case, the difference D2-D1 can be regarded as the thickness of the iron-nickel diffusion layer 12, wherein the difference D2-D1 can be determined by continuously measuring, with respect to the nickel-plated heat-treated steel sheet 1, the variation of the Fe intensity and the variation of the Ni intensity in the depth direction from the outermost surface toward the steel sheet 11 as described below by using a high frequency glow discharge optical emission spectrometric analyzer.

Specifically, first, by using the high frequency glow discharge optical emission spectrometric analyzer, the Fe intensity in the nickel-plated heat-treated steel sheet 1 is measured until the Fe intensity is saturated, and by adopting the saturated value of the Fe intensity as a reference, the depth (D1) giving the Fe intensity 10% of the saturated value is defined as the boundary between the nickel layer 14 and the iron-nickel diffusion layer 12.

Figure 5:
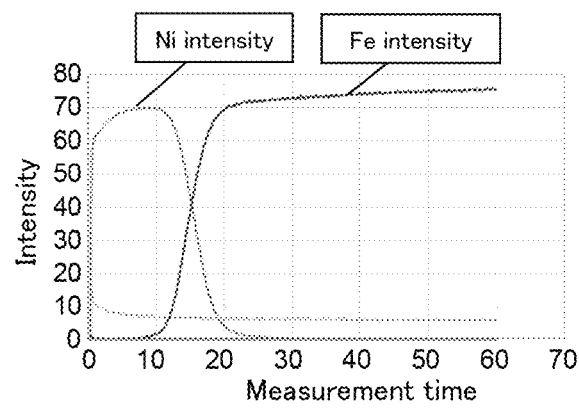
FIG. 5 presents graphs for illustrating the method for measuring the thickness of an iron-nickel diffusion layer.
Figure 5:
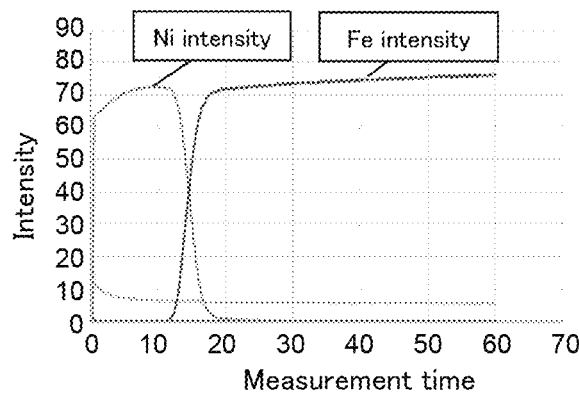

For example, the details are described with reference to FIG. 5(A) showing an example of the measurement results of the actually prepared nickel-plated heat-treated steel sheet 1 by using a high frequency glow discharge optical emission spectrometric analyzer. It is to be noted that, in FIG. 5(A), the ordinate represents the Fe intensity and the Ni intensity, and the abscissa represents the measurement time when the measurement is pertained in the depth direction from the surface of the nickel-plated heat-treated steel sheet 1 by using a high frequency glow discharge optical emission spectrometric analyzer.

In the present embodiment, first, the saturated value of the Fe intensity is determined on the basis of the measurement results of the Fe intensity. The saturated value of the Fe intensity is determined from the time variation rate (Fe intensity variation/second) of the Fe intensity. The time variation rate of the Fe intensity comes to be steeply large when Fe is detected after the start of the measurement, and decreases after passing the maximum value and is stabilized in the vicinity of approximately zero. The value when the time variation rate is stabilized at approximately zero is the saturated value, and specifically, when the time variation rate of the Fe intensity comes to be 0.02 (Fe intensity variation/second) or less, the measurement time in the depth direction can be taken as the measurement time of the saturation of the Fe intensity.

In the example shown in FIG. 5(A), the saturated value of the Fe intensity is a value of approximately 70 in the vicinity of the measurement time of 20 seconds, and the depth giving an Fe intensity of approximately 7, 10% of the saturated value, can be detected as the boundary between the nickel layer 14 and the iron-nickel diffusion layer 12.

On the other hand, the boundary between the iron-nickel diffusion layer 12 and the steel sheet 11 can be detected as follows. Specifically, when the Ni intensity of the nickel-plated heat-treated steel sheet 1 is measured by using a high frequency glow discharge optical emission spectrometric analyzer, the maximum value is extracted from the obtained graph showing the variation of the Ni intensity, and the depth (D2) giving a Ni intensity of 10% of the maximum value after the maximum value has been shown is determined as the boundary between the iron-nickel diffusion layer 12 and the steel sheet 11. For example, with reference to FIG. 5(A), the maximum value of the Ni intensity is a value of approximately 70 at the measurement time in the vicinity of 9 seconds, and accordingly, the depth giving a Ni intensity of approximately 7, 10% of the maximum value of the Ni intensity, can be detected as the boundary between the iron-nickel diffusion layer 12 and the steel sheet 11.

In addition, in the present embodiment, on the basis of the boundaries between the layers determined as described above, it is possible to determine the thickness of the iron-nickel diffusion layer 12. Specifically, when the measurement is performed by using a high frequency glow discharge optical emission spectrometric analyzer, the time giving an Fe intensity of 10% of the saturated value of the Fe intensity is set as the starting point, the measurement time until the time giving a Ni intensity of 10% of the maximum value after the Ni intensity has exhibited the maximum value is calculated, and on the basis of the calculated measurement time, the thickness of the iron-nickel diffusion layer 12 can be determined.

It is to be noted that when the thickness of the iron-nickel diffusion layer 12 of the nickel-plated heat-treated steel sheet 1 is determined on the basis of the measurement time, a high frequency glow discharge optical emission spectrometric analysis is preliminarily performed with respect to a nickel-plated steel sheet having a known plating thickness, and free from the application of a heat treatment as shown in FIG. 5(B), the thickness to be calculated as the iron-nickel diffusion layer in FIG. 5(B) is calculated, and the calculated thickness is required to be subtracted at the time of calculation of the thickness of the iron-nickel diffusion layer 12 of the nickel-plated heat-treated steel sheet 1 as the actual measurement object. Specifically, from the thickness of the iron-nickel diffusion layer 12 portion (the thickness value obtained in FIG. 5(A) as follows: the time giving the Fe intensity of 10% of the saturated value of the Fe intensity is taken as the starting point, the measurement time until the time giving the Ni intensity an intensity of 10% of the maximum value of the Ni intensity after the Ni intensity has exhibited the maximum value thereof is converted into the thickness) calculated from the graph of FIG. 5(A), the thickness calculated in the same manner from the graph of FIG. 5(B) is subtracted, and thus, the thickness of the actual iron-nickel diffusion layer 12 in the graph of FIG. 5(A) can be determined.

In the present invention, as described above, for the nickel-plated steel sheet having a known plating thickness and having undergone no heat treatment, a high frequency glow discharge optical emission spectrometric analysis is performed, the thickness calculated as an iron-nickel diffusion layer is taken as the "reference thickness," and the difference (D2-D1) between D1 and D2 indicates the value obtained by subtracting the reference thickness.

It is to be noted that in the measurement with a high frequency glow discharge optical emission spectrometric analyzer, with the increase of the thickness of the nickel plating layer, the reference thickness calculated from the measurement of the nickel plating layer comes to be increased; thus, when the thickness of the iron-nickel diffusion layer is determined, the reference thickness is checked in the plating deposition amount of each of the layers, or alternatively, it is desirable that the measurement of the reference thickness is performed in each of the two or more samples, different from each other in the plating deposition amount before performing heat treatment, the relation formula between the plating deposition amount and the reference thickness is determined, and then the thickness of the iron-nickel diffusion layer is calculated.

In addition, the measurement of the nickel-plated steel sheet free from the application of a heat treatment allows the relation between the depth time (the measurement time with a high frequency glow discharge optical emission spectrometric analyzer) and the actual thickness to be determined, and accordingly by utilizing the relation (the relation showing the relation between the depth time and the actual thickness), the depth time can be converted into the thickness of the iron-nickel diffusion layer 12 of the nickel-plated heat-treated steel sheet 1 as the actual measurement object.

It is to be noted that when the thickness of the iron-nickel diffusion layer 12 is measured as described above with a high frequency glow discharge optical emission spectrometric analyzer, sometimes there is a detection limit value of the thickness of the iron-nickel diffusion layer 12, due to the performances of the high frequency glow discharge optical emission spectrometric analyzer, the measurement conditions or the like. For example, when a heat-treated nickel-plated steel sheet 1 prepared by using, as the steel sheet 11, a steel sheet having a surface roughness Ra of 0.05 to 3 μm, as measured with a stylus-type roughness meter, is measured with a measurement diameter of φ5 mm of a high frequency glow discharge optical emission spectrometric analyzer, the detectable region (detection limit value with respect to shape) is approximately 0.04 µm; when the thickness of the iron-nickel diffusion layer 12 measured with the high frequency glow discharge optical emission spectrometric analyzer is equal to or less than the detection limit value, the thickness of the iron-nickel diffusion layer 12 can be regarded to be more than 0 µm and less than 0.04 µm. In other words, in the case where the nickel plating layer 13 is formed on the steel sheet 11, and subsequently the iron-nickel diffusion layer 12 and the nickel layer 14 are formed by performing a heat treatment, even when the thickness of the iron-nickel diffusion layer 12 is equal to or less than the detection limit value in the measurement of the thickness of the iron-nickel diffusion layer 12 by using the high frequency glow discharge optical emission spectrometric analyzer, the thickness of the iron-nickel diffusion layer 12 can be regarded to be more than 0 µm and less than 0.04 µm. It is to be noted that when the nickel plating layer 13 is formed on the steel sheet 11, and then a nickel-plated steel sheet is obtained by applying no heat treatment, the iron-nickel diffusion layer 12 can be regarded not to be foiled in the nickel-plated steel sheet (the thickness of the iron-nickel diffusion layer 12 is 0).

In the present embodiment, the difference (D2-D1) between D1 and D2 thus measured with a high frequency glow discharge optical emission spectrometric analyzer may be less than 0.04 µm. It is to be noted that the lower limit of the thickness of the iron-nickel diffusion layer 12 may be more than 0 µm, and the iron-nickel diffusion layer 12 may be formed even to the slightest extent. The thickness of the iron-nickel diffusion layer 12 is preferably 0.0001 µm or more and less than 0.04 µm, and more preferably 0.001 µm or more and less than 0.02 µm. As described above, D2-D1 is a numerical value representing the depth difference between the boundary between the steel sheet 11 and the iron-nickel diffusion layer and the boundary between the iron-nickel diffusion layer 12 and the nickel layer 14, and the fact that this value is small means that the iron-nickel diffusion layer is thin. As a nickel-plated heat-treated steel sheet 1 having such a constitution, for example, there may be mentioned a nickel-plated heat-treated steel sheet 1 obtained by performing the above-described heat treatment under the conditions of a temperature of 350° C. or higher and a soaking time of 30 seconds or more.

In the present embodiment, as described above, with respect to the nickel-plated heat-treated steel sheet 1, by applying a heat treatment after the formation of the nickel plating layer with a nickel amount of 4.4 to 26.7 g/m² by maintaining the nickel-plated heat-treated steel sheet 1 at a temperature of 350 to 450° C. for 30 seconds to 2 minutes, it is possible to control the nickel layer on the steel sheet 11 so as to fall within a nickel amount range from 4.4 to 26.7 g/m², and to obtain a nickel-plated heat-treated steel sheet having a difference between D1 and D2 of less than 0.04 µm. Such a nickel-plated heat-treated steel sheet is excellent in corrosion resistance because the dissolution of iron can be suppressed when processed into a battery can, and allows the sticking to hardly occur and is excellent in continuous pressability during mold-processing into a battery can because the surface layer of such a nickel-plated heat-treated steel sheet is hard. It is to be noted that conventionally in a surface-treated steel sheet having an iron-nickel diffusion layer formed thereon by applying a heat treatment after nickel plating, because the heat treatment conditions during formation of the iron-nickel diffusion layer involve a high temperature and a long time, the obtained surface-treated steel sheet has, as formed on the steel sheet, an iron-nickel diffusion layer and, as an upper layer of the iron-nickel diffusion layer, a nickel layer undergoing a progress of recrystallization and a drastic decrease of hardness or an iron-nickel diffusion layer further softer than the nickel layer. When such a steel sheet having a drastically decreased surface layer hardness is used, the sticking to the mold (punch) tends to occur during pressing for mold-processing into a battery can, and sometimes a battery can undergoing occurrence of such sticking is hardly released from the mold. When the number of the cases undergoing no release from the mold is increased, the productivity is decreased; therefore, when such a material is used, for the purpose of improving the continuous pressability, a lubricant is required to be used more frequently than in the molding of a nickel-plated steel sheet free from the application of a heat treatment into a battery can, a coating is required to be applied to the mold, or a strict control of the processing conditions is required to be performed. On the other hand, the surface-treated steel sheet free from the application of a heat treatment after plating has a hard coating and accordingly excellent in continuous pressability, but the battery can formed therefrom tends to undergo the dissolution of the base iron from the steel sheet as the substrate; for the purpose of ensuring high corrosion resistance, the thickness of the nickel plating is required to be increased, but the increase of the nickel plating thickness leads to the increase of cost and the decrease of the internal volume of the battery. Accordingly, in the technique for the surface-treated steel sheet for a battery container, it has been difficult to allow the corrosion resistance when formed into a battery can and the improvement of the continuous pressability during formation of a battery can to be compatible with each other. In contrast, according to the present embodiment, by applying a heat treatment after the formation of the nickel plating layer with a nickel amount of 4.4 to 26.7 g/m² by maintaining the nickel-plated heat-treated steel sheet 1 at a temperature of 350 to 450° C. for 30 seconds to 2 minutes, and thus by controlling the nickel layer on the steel sheet 11 so as to fall within a nickel amount range from 4.4 to 26.7 g/m² and by controlling the difference between D1 and D2 so as to be less than 0.04 µm, it is possible to provide a nickel-plated heat-treated steel sheet 1 highly balanced between the two properties, namely the corrosion resistance and the continuous pressability in such a way that with respect to the corrosion resistance as a battery can, the nickel-plated heat-treated steel sheet 1 is equal to or better than the surface-treated steel sheet based on the conventional heat treatment conditions, and the improvement of the continuous pressability during the formation of a battery can is also achieved.

In addition, there has hitherto been known a method in which in the surface-treated steel sheet provided with a nickel plating layer and an iron-nickel diffusion layer, the thickness of the iron-nickel diffusion layer is set to be 0.5 µm or more (for example, Japanese Patent Laid-Open No. 2009-263727, paragraph 0018), for example, from a viewpoint of improving the processing adhesiveness, a viewpoint of improving the corrosion resistance of the battery container, and a viewpoint of ensuring the adhesiveness of the iron-nickel diffusion layer, during being molded into a battery container. Herein, in order to set the thickness of the iron-nickel diffusion layer to be 0.5 µm or more, the condition of the heat treatment after the formation of the nickel plating layer on the steel sheet is required to be a long time or a high temperature. For example, when the condition of the heat treatment is set to be a long time, there have been known the conditions that the heat treatment temperature is set to be 400 to 600° C., and the heat treatment time is set to be 1 to 8 hours. In addition, when the condition of the heat treatment is set to be a high temperature, there have been known the conditions that the heat treatment temperature is set to be 700 to 800° C., and the heat treatment time is set to be 30 seconds to 2 minutes. The nickel layer after the application of a heat treatment under such heat treatment conditions is drastically softened as compared with a nickel-plated steel sheet having a comparable thickness and being free from the application of a heat treatment, in such a way that the Vickers hardness is decreased by 65 or more, and accordingly the sticking tends to occur. On the other hand, a surface-treated steel sheet having a nickel plating layer and being free from the application of a heat treatment is high in hardness but extremely poor in corrosion resistance. Under such circumstances, the present inventors have discovered that in the case where a nickel plating layer free from the application of a heat treatment is present on the surface layer, the hardness is high, and additionally, the ductility is poor due to the plating strain remaining in the plating coating, and accordingly the cracks generated in the plating coating during the formation processing of a battery can tend to be deep so as to reach the base iron, and thus the corrosion resistance is extremely poor.

In contrast, according to the present embodiment, with respect to the nickel-plated heat-treated steel sheet 1, by having a nickel layer with a nickel amount of 4.4 to 26.7 g/m² on the steel sheet, and by controlling the difference between D1 and D2 so as to be as comparatively thin as less than 0.04 µm, the suppression of the dissolution of iron is made possible when processed into a battery can, and accordingly the battery can is excellent in corrosion resistance; the nickel-plated heat-treated steel sheet 1 has a hard surface layer, and accordingly sticking hardly occurs during mold-processing into a battery can, and thus the nickel-plated heat-treated steel sheet 1 is excellent in continuous pressability. In the present embodiment, a heat treatment is applied in order to achieve the above-described constitution, accordingly the plating strain is reduced and the ductility of the nickel plating is improved; however, herewith when the nickel-plated heat-treated steel sheet 1 is mold-processed into a battery can as described below, the nickel layer 14 as the outermost layer of the nickel-plated heat-treated steel sheet 1 is extended due to the stress of the mold processing, and thus it is made possible to obtain an effect of covering with nickel the iron exposed to the surface of the nickel-plated heat-treated steel sheet 1. In addition, the nickel layer 14 obtained under the heat treatment conditions resulting in the above-described constitution gives a hardness of less than 65, and thus the sticking hardly occurs.

Such effects as described above are particularly exhibited when a processing (such as a drawing processing) is performed to result in a thickness reduction of 10% or less in relation to the original sheet thickness (the thickness of the nickel-plated heat-treated steel sheet 1).

In addition, in the present embodiment, the thickness of the nickel layer 14 is preferably 0.5 µm or more, more preferably 1.0 µm or more, further preferably 1.2 µm or more, and particularly preferably 1.5 µm or more. In addition, the upper limit of the thickness of the nickel layer 14 is not particularly limited, but is preferably 3.0 µm or less, and more preferably 2.8 µm or less.

By controlling the thickness of the nickel layer 14 so as to be comparatively thick in relation to the thickness of the iron-nickel diffusion layer 12, when the nickel-plated heat-treated steel sheet 1 is used as a battery container, the corrosion resistance of the battery container can be further improved. In other words, with respect to the nickel-plated heat-treated steel sheet 1 after the heat treatment, iron is exposed to the inner surface of the battery container, and sometimes iron appears locally. In contrast, in the present embodiment, by performing a heat treatment optimal for the processing, when the nickel-plated heat-treated steel sheet 1 is mold-processed, for example, by a deep drawing processing method, a drawing and ironing processing method (DI processing method), a drawing thin and redrawing processing method (DTR processing method), or a processing method using a stretch processing and an ironing processing in combination after a drawing processing, the nickel layer 14 as the outermost layer of the nickel-plated heat-treated steel sheet 1 is extended due to the stress of the mold-processing, nickel covers the iron exposed to the surface of the nickel-plated heat-treated steel sheet 1, and consequently, the corrosion resistance of the obtained battery container can be further improved. In particular, in the present embodiment, as described above, the thickness of the iron-nickel diffusion layer 12 is as extremely thin as less than 0.04 µm, and accordingly the thickness of the nickel layer 14 is extremely thick in relation to the thickness of the iron-nickel diffusion layer 12. Accordingly, the obtained nickel-plated heat-treated steel sheet 1 undergoes more remarkably the effect due to the above-described action of the nickel layer 14, namely, the effect of improving the corrosion resistance by covering the iron exposed to the surface of the nickel-plated heat-treated steel sheet 1 with nickel as a result of the extension of the nickel layer 14 as the outermost layer of the nickel-plated heat-treated steel sheet 1 caused by the stress of the mold-processing.

The thickness of the nickel layer 14 after the heat treatment can be determined by detecting the boundary between the nickel layer 14 and the iron-nickel diffusion layer 12, on the basis of the measurement using the above-described high frequency glow discharge optical emission spectrometric analyzer. In other words, the time at which the measurement of the surface of the nickel-plated heat-treated steel sheet 1 is started by using the high frequency glow discharge optical emission spectrometric analyzer is taken as the starting point, the measurement time until the time giving the Fe intensity of 10% of the saturated value of the Fe intensity is calculated, and on the basis of the calculated measurement time, the thickness of the nickel layer 14 can be determined. In the present embodiment, with a high frequency glow discharge optical emission spectrometric analyzer, the thickness of the iron-nickel diffusion layer 12 and the thickness of the nickel layer 14 are measured, and by using the obtained measurement results, the ratio of (thickness of iron-nickel diffusion layer 12/thickness of nickel layer 14) can be determined.

In addition, in the present embodiment, in the nickel layer 14 after the heat treatment, the average crystal grain size in the surface portion thereof is preferably 0.1 to 0.4 µm, more preferably 0.2 to 0.4 µm. In the present embodiment, the average crystal grain size in the surface portion of the nickel layer 14 is not particularly limited; when the average crystal grain size is too small, the plating stress remains accumulated, and in this case, when mold-processed as a battery container, a deep crack reaching the steel sheet occurs in the nickel-plated heat-treated steel sheet 1, and thus, the iron of the steel sheet 11 is sometimes exposed. In this case, iron is dissolved from the exposed portion of the steel sheet 11, and there is an adverse possibility that the gas generated along with the dissolution of iron increases the internal pressure of the interior of the battery. On the other hand, as described above, failures occur when the cracks reaching the steel sheet 11 are generated in the nickel-plated heat-treated steel sheet 1; however, from the viewpoint of improving the battery properties of the battery container, it is preferable for fine cracks to occur on the inner surface side of the battery container formed of the nickel-plated heat-treated steel sheet 1. In this regard, when the average crystal grain size in the surface portion of the nickel layer 14 is too large, the hardness of the nickel layer 14 sometimes comes to be too low (the nickel layer 14 is excessively softened); in this case, sticking tends to occur when the nickel-plated heat-treated steel sheet 1 is mold-processed into a battery can, and consequently, the battery can is liable to be hardly released from the mold. In addition, when nickel-plated heat-treated steel sheet 1 is mold-processed as a battery container, fine cracks cannot be generated on the inner surface of the battery container, and accordingly, there is an adverse possibility that the following effect is not sufficiently obtained: the effect of improving the battery properties, namely, the effect of improving the battery properties by increasing the contact area between the battery container and the positive electrode mixture owing to the cracks and thereby decreasing the internal resistance of the battery.

It is to be noted that the average crystal grain size in the surface portion of the nickel layer 14 tends to be larger with the increase of the heat treatment temperature in the heat treatment, and the present inventors have discovered that the magnitude of the average crystal grain size increases in a stepwise manner depending on the temperature range. The crystal grains are larger in the case where heat treatment is applied even at a low temperature such as 300° C., as compared with the case where no heat treatment is applied. When the heat treatment temperature is set to be between 400 and 600° C., the crystal grain size increases with the increase of the temperature, but the difference of the magnitude of the crystal grain size due to the temperature is moderate. When the heat treatment temperature exceeds 700° C., the average crystal grain size steeply increases. Accordingly, by controlling the heat treatment temperature of the heat treatment, it is possible to regulate the average crystal grain size in the surface portion of the nickel layer 14.

In the present embodiment, the average crystal grain size in the surface portion of the nickel layer 14 can be determined, for example, by using the backscattered electron image obtained by measuring the surface of the nickel-plated heat-treated steel sheet 1 with a scanning electron microscope (SEM).

Figure 6:
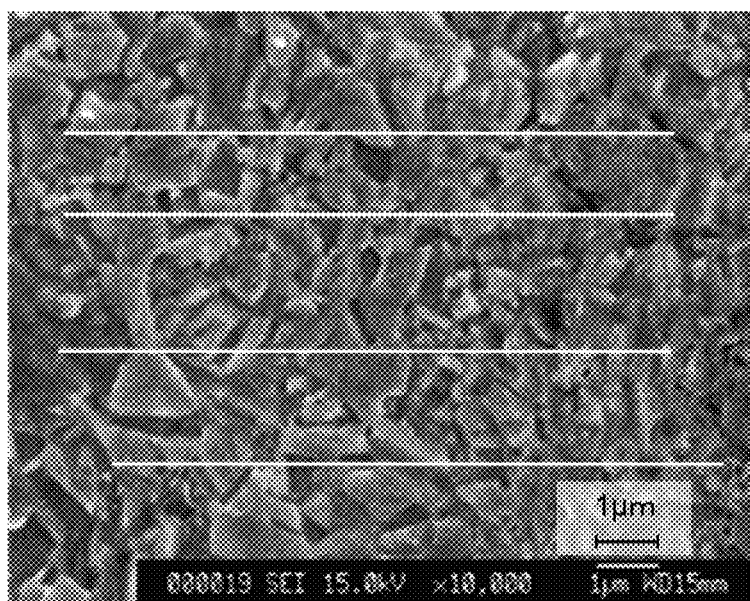
FIG. 6 presents a photograph for illustrating the method for measuring the average crystal grain size in the surface potion of a nickel layer.

Specifically, first, the surface of the nickel-plated heat-treated steel sheet 1 is etched if necessary, then the surface of the nickel-plated heat-treated steel sheet 1 is measured with a scanning electron microscope (SEM), as shown in FIG. 6. It is to be noted that FIG. 6 is an example of the image representing the backscattered electron image obtained by measuring, at a magnification of 10,000, an actually prepared nickel-plated heat-treated steel sheet 1. Then, on the obtained backscattered electron image, an optional number of straight line segments of 10 μm in length are drawn (four lines, for example). Then, in each of the line segments, on the basis of the number n of the crystal grains located on the straight line segment, the crystal grain size d is determined by using the formula $d=10/(n+1)$, and the average value of the crystal grain sizes d obtained for the respective straight line segments can be taken as the average crystal grain size in the surface portion of the nickel plating layer 13.

In addition, in the present embodiment, the surface hardness of the nickel layer 14 after the heat treatment is such that the lower limit is preferably more than 220, and more preferably 250 or more, in terms of the Vickers hardness (HV) measured with a load of 10 gf. The upper limit is different depending on the nickel plating thickness, but is preferably 310 or less. By setting the surface hardness of the nickel layer 14 after the heat treatment so as to fall within the above-described range, the processability is more improved when the obtained nickel-plated heat-treated steel sheet 1 is processed into a battery container, and it is possible to more enhance the suppression effect of the sticking to the mold when the obtained nickel-plated heat-treated steel sheet 1 is mold-processed into a battery container.

In the present embodiment, with respect to the nickel-plated heat-treated steel sheet 1, as a method for controlling the thickness of the iron-nickel diffusion layer 12 and the total amount of the nickel contained are controlled in the iron-nickel diffusion layer and the nickel contained in the nickel layer so as to fall within the above-described ranges, respectively, a method for performing the heat treatment under the above-described conditions may be mentioned. Specifically, there may be mentioned a method in which after the nickel plating layer 13 is formed on the steel sheet 11, a thermal diffusion treatment is performed under the conditions that the heat treatment temperature is 350° C. or higher and lower than 450° C., and the heat treatment time is 30 seconds to 2 minutes.

It is to be noted that the thickness of the iron-nickel diffusion layer 12 tends to be thick, with the increase of the heat treatment temperature, and with the increase of the heat treatment time in the heat treatment. Accordingly, by controlling the heat treatment temperature and the heat treatment time of the heat treatment, it is possible to regulate the thickness of the iron-nickel diffusion layer 12 and the ratio of (thickness of iron-nickel diffusion layer 12/thickness of nickel layer 14). However, because it is difficult to form an iron-nickel diffusion layer at 300° C. or lower, from the viewpoint of controlling the thickness of the iron-nickel diffusion layer 12, and the ratio of (thickness of iron-nickel diffusion layer 12/thickness of nickel layer 14) so as to fall within the above-described ranges, it is preferable to perform a heat treatment at 350° C. or higher.

The nickel-plated heat-treated steel sheet 1 of the present embodiment is constituted as described above.

The nickel-plated heat-treated steel sheet 1 of the present embodiment is used as mold-processed into the positive electrode can 21 of an alkaline battery 2 shown in FIGS. 1 and 2, battery containers of other batteries and the like, by using, for example, a deep drawing processing method, a drawing and ironing processing method (DI processing method), a drawing thin and redrawing processing method (DTR processing method), or a processing method using a stretch processing and an ironing processing in combination after a drawing processing.

<Method for Producing Nickel-Plated Heat-Treated Steel Sheet 1>

Next, a method for producing the nickel-plated heat-treated steel sheet 1 of the present embodiment is described.

First, the steel sheet 11 is prepared, and as described above, a nickel plating is applied to the steel sheet 11, to form the nickel plating layer 13 on the surface of the steel sheet 11, to be the inner surface of a battery container. It is to be noted that the nickel plating layer 13 is preferably foamed not only on the surface of the steel sheet 11 to be the inner surface of the battery container but also on the opposite surface. When the nickel plating layer 13 is formed on both surfaces of the steel sheet 11, the nickel plating layers 13 different from each other in the composition and the surface roughness may be formed on the surface in the steel sheet 11 to be the inner surface of the battery container and on the surface of the steel sheet 11 to be the outer surface of the battery container, respectively, by using plating baths having different compositions; however, from the viewpoint of improving the production efficiency, it is preferable to form the nickel plating layers 13 on both surfaces of the steel sheet 11, by using the same plating bath in one step.

Next, by performing the heat treatment under the above-described conditions for the steel sheet 11 having the nickel plating layer 13 formed thereon, the iron constituting the steel sheet 11 and the nickel constituting the nickel plating layer 13 are allowed to thermally diffuse, to form the iron-nickel diffusion layer 12 and the nickel layer 14. Herewith, the nickel-plated heat-treated steel sheet 1 as shown in FIG. 3 is obtained.

It is to be noted that in the present embodiment, a temper rolling may be applied to the obtained nickel-plated heat-treated steel sheet 1. Herewith, it is possible to regulate the surface roughness of the surface of the nickel-plated heat-treated steel sheet 1 to be the inner surface of the battery container; when the nickel-plated heat-treated steel sheet 1 is used as a battery container, the contact area between the battery container and the positive electrode mixture can be increased, the internal resistance of the battery can be decreased, and the battery properties can be improved.

As described above, the nickel-plated heat-treated steel sheet 1 of the present embodiment is produced.

In the nickel-plated heat-treated steel sheet 1 of the present embodiment, as described above, by setting the thickness of the iron-nickel diffusion layer 12 to be comparatively as thin as more than 0 μm and less than 0.04 μm, and by controlling the total amount of the nickel contained in the iron-nickel diffusion layer and the nickel contained in the nickel layer so as to fall within a range from 4.4 to 26.7 g/m$^2$, with respect to the alkaline battery 2 prepared by using the nickel-plated heat-treated steel sheet 1, more remarkable is the effect due to the action of the nickel layer 14, namely, the effect of improving the corrosion resistance by covering the iron exposed to the surface of the nickel-plated heat-treated steel sheet 1 with nickel as a result of the extension of the nickel layer 14 as the outermost layer of the nickel-plated heat-treated steel sheet 1 caused by the stress during the mold-processing of the nickel-plated heat-treated steel sheet 1 into a battery container; herewith it is possible to effectively prevent the generation of gas even when the alkaline battery 2 is used or stored over a long term, and herewith it is possible to prevent the increase of the internal pressure of the interior of the battery due to the generation of gas. Moreover, as described above, by setting the thickness of the nickel layer 14 to be preferably more than 0.5 μm, the corrosion resistance when the nickel-plated heat-treated steel sheet 1 is used for the battery container is more improved, and it is possible to more effectively prevent the generation of gas in the interior of such a battery and the increase of the internal pressure due to the generation of gas. Accordingly, the nickel-plated heat-treated steel sheet 1 of the present embodiment can be suitably used as the battery containers of the batteries such as alkaline batteries, the batteries using alkaline electrolytic solutions such as nickel-hydrogen batteries, and lithium-ion batteries.

EXAMPLES

Hereinafter, the present invention is described more specifically with reference to Examples, but the present invention is not limited to these Examples.

Example 1

As a base sheet, there was prepared a steel sheet 11 obtained by annealing a cold rolled sheet (thickness: 0.25 mm) of a low-carbon aluminum-killed steel having the chemical composition shown below:

C: 0.045% by weight, Mn: 0.23% by weight, Si: 0.02% by weight, P: 0.012% by weight, S: 0.009% by weight, Al: 0.063% by weight, N: 0.0036% by weight, the balance: Fe and inevitable impurities.

Then, the prepared steel sheet 11 was subjected to alkaline electrolytic degreasing and sulfuric acid immersion pickling, then subjected to electrolytic plating under the below-described conditions, and thus a nickel plating layer 13 was formed on the steel sheet 11 so as to have a thickness of 2 μm. It is to be noted that the thickness of the nickel plating layer 13 was calculated from the deposition amount thereof determined by performing a fluorescent X-ray measurement. The results thus obtained are shown in Table 1.

Bath composition: nickel sulfate: 250 g/L, nickel chloride: 45 g/L, boric acid: 45 g/L
pH: 3.5 to 4.5
Bath temperature: 60° C.
Electric current density: 20 A/dm$^2$
Energizing time: 32 seconds Next, the steel sheet 11 having the nickel plating layer 13 formed thereon was subjected to a heat treatment by continuous annealing under the conditions of a heat treatment temperature of 350° C., a heat treatment time of 30 seconds, and a reductive atmosphere, and thus an iron-nickel diffusion layer 12 and a nickel layer 14 were formed, to obtain a nickel-plated heat-treated steel sheet 1.

Next, the obtained nickel-plated heat-treated steel sheet 1 was subjected to a temper rolling under the condition of an extension percentage of 1%.

Then, by using the nickel-plated heat-treated steel sheet 1 after the temper rolling, according to the below-described methods, the measurement of the thickness of the iron-nickel diffusion layer 12 and the thickness of the nickel layer 14 was performed.

<Measurement of Thickness of Iron-Nickel Diffusion Layer 12 and Thickness of Nickel Layer 14>

With respect to the nickel-plated heat-treated steel sheet 1, by using a high frequency glow discharge optical emission spectrometric analyzer, the variations of the Fe intensity and the Ni intensity were continuously measured in the depth direction from the outermost layer toward the steel sheet 11, the time giving the Fe intensity of 10% of the saturated value of the Fe intensity is taken as the starting point, the measurement time until the time giving the Ni intensity an intensity of 10% of the maximum value of the Ni intensity after the Ni intensity had exhibited the maximum value thereof was calculated, and on the basis of the calculated measurement time, the thickness of the iron-nickel diffusion layer 12 was determined. It is to be noted that when the thickness of the iron-nickel diffusion layer 12 was determined, the thickness of the iron-nickel diffusion layer 12 was measured, first, on the basis of the results obtained by performing the high frequency glow discharge optical emission spectrometric analysis of the below-described nickel-plated steel sheet (Comparative Example 2) undergoing no heat treatment, the measurements were performed by taking as the reference thickness the thickness measured as the iron-nickel diffusion layer (the value obtained by converting the measurement time into the thickness as follows: the time giving the Fe intensity 10% of the saturated value of the Fe intensity was taken as the starting point, the measurement time until the time giving the Ni intensity 10% of the maximum value after the Ni intensity had exhibited the maximum value thereof was converted into the thickness). It is to be noted that the reference thickness was 0.55 μm. In addition, the thickness of the actual iron-nickel diffusion layer 12 in Example 1 was determined by subtracting the reference thickness from the thickness (the value obtained by converting the measurement time into the thickness as follows: the time giving the Fe intensity 10% of the saturated value of the Fe intensity was taken as the starting point, the measurement time until the time giving the Ni intensity 10% of the maximum value after the Ni intensity had exhibited the maximum value thereof was converted into the thickness) of the iron-nickel diffusion layer 12 of the nickel-plated heat-treated steel sheet of Example 1. It is to be noted that in Example 1, the thickness of the iron-nickel diffusion layer 12 was equal to or smaller than the detectable region (0.04 μm) with a high frequency glow discharge optical emission spectrometric analyzer, and accordingly, the thickness of the iron-nickel diffusion layer 12 was regarded to be more than 0 μm and less than 0.04 μm (the same shall apply in below-described Examples 2 to 4 and Comparative Example 3). In addition, for the nickel layer 14, by taking as the starting point the time at which the measurement of the surface of the nickel-plated heat-treated steel sheet 1 was started with the high frequency glow discharge optical emission spectrometric analyzer, the measurement time until the Fe intensity was given an intensity of 10% of the saturated value of the Fe intensity was calculated, and on the basis of the calculated measurement time, the thickness of the nickel layer 14 was determined. Then, on the basis of the measurement result, the ratio of the thickness of the iron-nickel diffusion layer 12 to the thickness of the nickel layer 14 (thickness of iron-nickel diffusion layer 12/thickness of nickel layer 14) was determined. The results thus obtained are shown in Table 1. It is to be noted that, in Table 1, the ratio of (thickness of iron-nickel diffusion layer 12/thickness of nickel layer 14) was described as "Thickness ratio Fe—Ni/Ni." In Example 1, the thickness of the iron-nickel diffusion layer 12 was regarded to be more than 0 μm and less than 0.04 μm, and accordingly, in Table 1, the "thickness ratio Fe—Ni/Ni" was taken to be "0<" (the same shall apply in below-described Examples 2 to 7).

It is to be noted that in the measurement with a high frequency glow discharge optical emission spectrometric analyzer, with the increase of the thickness of the nickel plating layer, the reference thickness calculated from the measurement of the nickel plating layer comes to be increased; thus, when the thickness of the iron-nickel diffusion layer is determined, the reference thickness is checked in the plating deposition amount of each of the layers, or alternatively, it is desirable that the measurement of the reference thickness is performed in each of the two or more samples, different from each other in the plating deposition amount before performing heat treatment, the relation formula between the plating deposition amount and the reference thickness is determined, and then the thickness of the iron-nickel diffusion layer is calculated.

It is to be noted that in below-described Examples 5 to 7 and Comparative Examples 5 to 7, as the reference thickness used in the calculation of the iron-nickel diffusion layer, the below-described reference thickness calculated from Comparative Example 1 was used.

Examples 2 to 7

In each of Examples 2 to 7, a nickel-plated heat-treated steel sheet 1 was obtained in the same manner as in Example 1 except that the plating deposition amount of the nickel plating layer 13, and the continuous annealing conditions (heat treatment conditions) for the steel sheet 11 having a nickel plating layer 13 formed thereon were altered as shown in Table 1, and the measurements were performed in the same manner. The results thus obtained are shown in Table 1.

Comparative Example 1

A nickel-plated steel sheet was prepared under the same conditions as in Example 1 except that the targeted plating deposition amount of the nickel plating layer 13 was altered from 17.8 g/m² to 8.9 g/m², and neither a continuous annealing nor a temper rolling was performed after the nickel plating layer 13 was formed. In the prepared nickel-plated steel sheet, the thickness of the nickel plating layer 13 was determined as the thickness of the nickel layer 14. The results thus obtained are shown in Table 1.

Comparative Example 2

A nickel-plated steel sheet was prepared under the same conditions as in Example 1 except that neither a continuous annealing nor a temper rolling was performed after the nickel plating layer 13 was formed. In the prepared nickel-plated steel sheet, the thickness of the nickel plating layer 13 was determined as the thickness of the nickel layer 14. The results thus obtained are shown in Table 1.

Comparative Examples 3 to 7

In each of Comparative Examples 3 to 7, a nickel-plated heat-treated steel sheet 1 was obtained in the same manner as in Example 1 except that the thickness of the nickel plating layer 13, and the continuous annealing conditions (heat treatment conditions) for the steel sheet 11 having a nickel plating layer 13 formed thereon were altered as shown in Table 1, and the measurements were performed in the same manner. The results thus obtained are shown in Table 1.

Reference Example 1

A nickel-plated steel sheet was prepared under the same conditions as in Example 1 except that the targeted plating deposition amount of the nickel plating layer 13 was altered from 17.8 g/m² to 10.7 g/m², and neither a continuous annealing nor a temper rolling was performed after the nickel plating layer 13 was foamed. Then, the prepared nickel-plated steel sheet was subjected to measurements, as described above, on the basis of the high frequency glow discharge optical emission spectrometric analysis to obtain the measurement results shown in FIG. 5(B), and the measurements were performed by taking as the reference thickness the thickness measured as the iron-nickel diffusion layer (the value obtained by converting the measurement time into the thickness as follows: in FIG. 5(B), the time giving the Fe intensity 10% of the saturated value of the Fe intensity was taken as the starting point, the measurement time until the time giving the Ni intensity 10% of the maximum value after the Ni intensity had exhibited the maximum value thereof was converted into the thickness). The results thus obtained are shown in Table 1 and FIG. 5(B).

TABLE 1

| | Before heat treatment | Heat treatment conditions | | After heat treatment | | |
|---|---|---|---|---|---|---|
| | Plating amount (g/m²) | Temperature [° C.] | Time | Nickel layer 14 Thickness [µm] | Iron-nickel diffusion layer 12 Thickness [µm] | Thickness ratio Fe—Ni/Ni |
| Example 1 | 17.9 | 350 | 30 sec | 2.01 | More than 0 µm, less than 0.04 µm | 0< |
| Example 2 | 18.1 | 400 | 30 sec | 2.03 | More than 0 µm, less than 0.04 µm | 0< |
| Example 3 | 18.9 | 450 | 30 sec | 2.12 | More than 0 µm, less than 0.04 µm | 0< |
| Example 4 | 18.5 | 450 | 60 sec | 2.08 | More than 0 µm, less than 0.04 µm | 0< |
| Example 5 | 9.5 | 400 | 30 sec | 1.07 | More than 0 µm, less than 0.04 µm | 0< |
| Example 6 | 9.7 | 350 | 30 sec | 1.09 | More than 0 µm, less than 0.04 µm | 0< |
| Example 7 | 10.2 | 450 | 30 sec | 1.15 | More than 0 µm, less than 0.04 µm | 0< |
| Comparative Example 1 | 8.9 | — | — | 1.0 | Absent (Reference thickness) | — |
| Comparative Example 2 | 17.8 | — | — | 2.0 | Absent (Reference thickness) | — |
| Comparative Example 3 | 17.2 | 500 | 60 min | 1.77 | 0.33 | 0.186 |
| Comparative Example 4 | 18.6 | 700 | 30 sec | 1.87 | 0.45 | 0.241 |
| Comparative Example 5 | 10.7 | 600 | 30 sec | 1.07 | 0.26 | 0.243 |
| Comparative Example 6 | 9.9 | 700 | 30 sec | 0.89 | 0.44 | 0.494 |
| Comparative Example 7 | 18.8 | 600 | 30 sec | 1.98 | 0.27 | 0.136 |
| Reference Example 1 | 10.6 | — | — | Reference thickness | Reference thickness | — |

Next, the nickel-plated heat-treated steel sheets 1 of Examples 2, 3, 5 and 7 and Comparative Examples 4 to 7, and the nickel-plated steel sheets of Comparative Examples 1 and 2 were evaluated with respect to the corrosion resistance and measured with respect to the surface hardness when each of these steel sheets was molded into a battery container, according to the below-described methods.

<Evaluation of Corrosion Resistance>

A blank was prepared by punching out a nickel-plated heat-treated steel sheet 1 into a predetermined shape with a press machine, the obtained blank was subjected to a drawing processing under the below-described conditions in such a way that the nickel layer 14 was on the inner surface side, and thus a battery container was prepared. Specifically, a tubular body was obtained by applying a drawing and ironing processing to the blank by using a drawing and ironing machine including drawing dies or ironing dies, each having a predetermined clearance, arranged in six stages and by using a punch, and a battery container was obtained by cutting the lug part in the vicinity of the opening of the obtained tubular body.

Next, the obtained battery container was evaluated with respect to the amount of Fe ions dissolved as follows: the obtained battery container was filled with a 10 mol/L potassium hydroxide solution, sealed and stored under the conditions of 60° C., 480 hours, then the amount of Fe ions dissolved from the inner surface of the battery container into the solution was measured with a high frequency inductively coupled plasma emission spectrometric analyzer (ICP) (ICPE-9000, manufactured by Shimadzu Corp.), and the amount of Fe ions dissolved was evaluated on the basis of the following standards. When the evaluation was A or B in the following standards, the dissolution of iron from the inner surface of the battery container was determined to be sufficiently suppressed. The results thus obtained are shown in Tables 2 and 3.

A: The amount of Fe ions dissolved was 30 mg/L or less.

B: The amount of Fe ions dissolved was more than 30 mg/L and 35 mg/L or less.

C: The amount of Fe ions dissolved was more than 35 mg/L.

<Measurement of Surface Hardness>

For the nickel layer 14 of the nickel-plated heat-treated steel sheet 1 (or the nickel plating layer 13 of the nickel-plated steel sheet), the surface hardness measurement was performed by measuring the Vickers hardness (HV) with a micro hardness tester (model: MVK-G2, manufactured by Akashi Seisakusho Co., Ltd.), by using a diamond indenter, under the conditions of a load of 10 gf and a holding time of 10 seconds, and the result obtained was evaluated on the basis of the following standards. When the evaluation was A+, A or B in the following standards, it was determined that the above-described nickel layer 14 or nickel plating layer 13 had a sufficient hardness, and the processability when the nickel-plated heat-treated steel sheet 1 or the nickel-plated steel sheet was processed into a battery container (the capability of generating fine cracks to an appropriate extent on the inner surface of the battery container when the nickel-plated heat-treated steel sheet 1 was mold-processed into a battery container) and the suppression effect of the sticking to the mold were excellent. The results thus obtained are shown in Tables 2 and 3.

A+: 280 or more

A: more than 250 and less than 280

B: more than 220 and 250 or less
C: 220 or less excessive heat treatment, the result of the corrosion resistance was excellent, but the hardness was too low, as in

TABLE 2

| | Before heat treatment | Heat treatment conditions | | After heat treatment | | | | Surface hardness | |
|---|---|---|---|---|---|---|---|---|---|
| | Plating amount (g/m²) | Temperature [° C.] | Time | Nickel layer 14 Thickness [μm] | Iron-nickel diffusion layer 12 Thickness [μm] | Thickness ratio Fe—Ni/Ni | Corrosion resistance | Vickers hardness (HV) | Evaluation |
| Example 2 | 18.1 | 400 | 30 sec | 2.03 | More than 0 μm, less than 0.04 μm | 0< | A | 309 | A+ |
| Example 3 | 18.9 | 450 | 30 sec | 2.12 | More than 0 μm, less than 0.04 μm | 0< | A | 256 | A |
| Comparative Example 1 | 8.9 | — | — | 1.0 | Absent (Reference Thickness) | — | C | 289 | N |
| Comparative Example 2 | 17.8 | — | — | 2.0 | Absent (Reference thickness) | — | C | 315 | N |
| Comparative Example 4 | 18.6 | 700 | 30 sec | 1.87 | 0.45 | 0.241 | A | 217 | C |
| Comparative Example 7 | 18.8 | 600 | 30 sec | 1.98 | 0.27 | 0.136 | A | 220 | C |

TABLE 3

| | Before heat treatment | Heat treatment conditions | | After heat treatment | | | | Surface hardness | |
|---|---|---|---|---|---|---|---|---|---|
| | Plating amount (g/m²) | Temperature [° C.] | Time | Nickel layer 14 Thickness [μm] | Iron-nickel diffusion layer 12 Thickness [μm] | Thickness ratio Fe—Ni/Ni | Corrosion resistance | Vickers hardness (HV) | Evaluation |
| Example 5 | 9.5 | 400 | 30 sec | 1.07 | More than 0 μm, less than 0.04 μm | 0< | B | 256 | A |
| Example 7 | 10.2 | 450 | 30 sec | 1.15 | Mora than 0 μm, less than 0.04 μm | 0< | A | 242 | B |
| Comparative Example 1 | 8.9 | — | — | 1.0 | Absent (Reference thickness) | — | C | 289 | N |
| Comparative Example 2 | 17.8 | — | — | 2.0 | Absent (Reference thickness) | — | C | 315 | N |
| Comparative Example 5 | 10.7 | 600 | 30 sec | 1.07 | 0.26 | 0.243 | B | 220 | C |
| Comparative Example 6 | 9.9 | 700 | 30 sec | 0.89 | 0.44 | 0.494 | B | 209 | C |

As shown in Table 2, Examples 2 and 3 in each of which the thickness of the iron-nickel diffusion layer 12 was more than 0 μm and less than 0.04 μm, and the total amount of the nickel contained in the iron-nickel diffusion layer and the nickel contained in the nickel layer was 4.4 to 26.7 g/m² gave the results that either of these Examples is excellent in corrosion resistance. Moreover, it is conceivable that Examples 2 and 3 both had a sufficient hardness, and accordingly, when the obtained nickel-plated heat-treated steel sheet 1 was processed into a battery container, the processability and the suppression effect of the sticking to the mold were both excellent.

On the other hand, as shown in Table 2, Comparative Examples 1 and 2 free from the application of a heat treatment gave the results that these Comparative Examples were poor in corrosion resistance; moreover, it is conceivable that in each of these Comparative Examples, the iron-nickel diffusion layer 12 was not foamed due to no application of a heat treatment, and accordingly, the adhesiveness between the steel sheet 11 and the nickel plating layer 13 was poor.

In addition, it is conceivable that even in the case where a heat treatment was performed, when the thickness of the iron-nickel diffusion layer 12 was made too thick due to an excessive heat treatment, the result of the corrosion resistance was excellent, but the hardness was too low, as in Comparative Examples 4 and 7; herewith, when the obtained nickel-plated heat-treated steel sheet 1 was processed into a battery container, the processability and the suppression effect of the sticking to the mold were poor.

In addition, as shown in Table 3, Examples 5 and 7 in each of which the thickness of the iron-nickel diffusion layer 12 was more than 0 μm and less than 0.04 μm, and the total amount of the nickel contained in the iron-nickel diffusion layer and the nickel contained in the nickel layer was 4.4 to 26.7 g/m² gave the results that Examples 5 and 7 were both evaluated as excellent in corrosion resistance. Moreover, it is conceivable that Examples 5 and 7 both had a sufficient hardness, and accordingly, in Examples 5 and 7, the processability and the suppression effect of the sticking to the mold when the nickel-plated heat-treated steel sheet 1 was processed into a battery container were both excellent.

On the other hand, as shown in Table 3, Comparative Examples 1 and 2, free from the application of a heat treatment, gave the results that Comparative Examples 1 and 2 were poor in corrosion resistance, and moreover, it is conceivable that in each of Comparative Examples 1 and 2, the iron-nickel diffusion layer 12 was not formed because of being free from the application of a heat treatment, and accordingly the adhesiveness between the steel sheet 11 and the nickel plating layer 13 was poor.

In addition, it is conceivable that even in the case where a heat treatment was performed, when the thickness of the iron-nickel diffusion layer 12 was made too thick due to an excessive heat treatment, the result of the corrosion resistance was excellent, but the hardness was too low, as in Comparative Examples 5 and 6; herewith, when the obtained nickel-plated heat-treated steel sheet 1 was processed into a battery container, the processability and the suppression effect of the sticking to the mold were poor.

REFERENCE SIGNS LIST

1 . . . surface-treated steel sheet
   11 . . . steel sheet
   12 . . . iron-nickel diffusion layer
   13 . . . nickel plating layer
   14 . . . nickel layer
2 . . . alkaline battery
   21 . . . positive electrode can
   211 . . . positive electrode terminal
   22 . . . negative electrode terminal
   23 . . . positive electrode mixture
   24 . . . negative electrode mixture
   25 . . . separator
   26 . . . current collector
   27 . . . gasket
   28 . . . insulating ring
   29 . . . exterior case

The invention claimed is:

1. A nickel-plated heat-treated steel sheet for a battery can, comprising:
an iron-nickel diffusion layer formed on a first surface of a steel sheet to be an inner surface of the battery can,
a first nickel layer constituting an outermost layer with a nickel amount of 4.4 to 26.7 g/m² on the iron-nickel diffusion layer, and
a second nickel layer constituting an outermost layer on a second surface of the steel sheet to be an outer surface of the battery can,
wherein when an Fe intensity and a Ni intensity are continuously measured along a depth direction from the first surface of the nickel-plated heat-treated steel sheet for a battery can, by using a high frequency glow discharge optical emission spectrometric analyzer, a difference (D2-D1) between a depth (D1) at which the Fe intensity exhibits a first predetermined value and a depth (D2) at which the Ni intensity exhibits a second predetermined value is less than 0.04 μm,
wherein the depth (D1) exhibiting the first predetermined value is the depth exhibiting an intensity of 10% of a saturated value of the Fe intensity measured by the above-described measurement, and
the depth (D2) exhibiting the second predetermined value is the depth exhibiting an intensity of 10% of a maximum value when the measurement is further performed along the depth direction after the Ni intensity shows the maximum value by the above-described measurement,
wherein the outermost layer on the iron-nickel diffusion layer consists of nickel and the outermost layer on the second surface of the steel sheet consists of nickel.

2. The nickel-plated heat-treated steel sheet for a battery can according to claim 1, wherein a ratio of a thickness of the iron-nickel diffusion layer to a thickness of the first nickel layer (thickness of iron-nickel diffusion layer/thickness of first nickel layer) is 0.08 or less.

3. The nickel-plated heat-treated steel sheet for a battery can according to claim 1, wherein a thickness of the first nickel layer is more than 0.5 μm.

4. The nickel-plated heat-treated steel sheet for a battery can according to claim 1, wherein a Vickers hardness (HV) of the first nickel layer measured with a load of 10 gf is more than 220.

5. A battery container made of the nickel-plated heat-treated steel sheet for a battery can according to claim 1.

6. A battery provided with the battery container according to claim 5.

7. A method for producing a nickel-plated heat-treated steel sheet for a battery can, comprising:
forming a first nickel plating layer on a first surface of a steel sheet to be an inner surface of the battery can with a nickel amount of 4.4 to 26.7 g/m²,
forming a second nickel plating layer on a second surface of the steel sheet to be an outer surface of the battery can, and
applying a heat treatment to the steel sheet having the first nickel plating layer and the second nickel plating layer formed thereon by maintaining the steel sheet at a temperature of 350° C. or higher and lower than 450° C. for 30 seconds to 2 minutes so as to form an iron-nickel diffusion layer and a first nickel layer constituting an outermost layer of the first surface, and a second nickel layer constituting an outermost layer of the second surface,
wherein the outermost layer of the first surface consists of nickel and the outermost layer of the second surface consists of nickel.

* * * * *